US006694375B1

(12) United States Patent
Beddus et al.

(10) Patent No.: US 6,694,375 B1
(45) Date of Patent: Feb. 17, 2004

(54) COMMUNICATIONS NETWORK AND METHOD HAVING ACCESSIBLE DIRECTORY OF USER PROFILE DATA

(75) Inventors: Simon A Beddus, Ipswich (GB); Gary L Bruce, Woodbridge (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/530,732

(22) PCT Filed: Nov. 24, 1998

(86) PCT No.: PCT/GB98/03503

§ 371 (c)(1),
(2), (4) Date: May 5, 2000

(87) PCT Pub. No.: WO99/29081

PCT Pub. Date: Jun. 10, 1999

(30) Foreign Application Priority Data

Dec. 4, 1997 (EP) .............................................. 97309810

(51) Int. Cl.[7] .............................................. G06F 15/16
(52) U.S. Cl. ..................................................... 709/249
(58) Field of Search ................................. 709/203, 206, 709/244, 249; 707/10

(56) References Cited

U.S. PATENT DOCUMENTS

| 4,611,094 | A |   | 9/1986  | Asmuth et al.              |
|-----------|---|---|---------|----------------------------|
| 5,206,899 | A |   | 4/1993  | Gupta et al.               |
| 5,790,785 | A | * | 8/1998  | Klug et al. ......... 713/202  |
| 5,813,006 | A | * | 9/1998  | Polnerow et al. ..... 707/10 |
| 5,918,227 | A | * | 6/1999  | Polnerow et al. ..... 707/10 |
| 5,920,820 | A | * | 7/1999  | Qureshi et al. ..... 455/461 |
| 6,185,184 | B1| * | 2/2001  | Mattaway et al. .... 370/230 |
| 6,195,660 | B1| * | 2/2001  | Polnerow et al. ..... 707/10 |
| 6,230,188 | B1| * | 5/2001  | Marcus .............. 709/206 |
| 6,324,538 | B1| * | 11/2001 | Wesinger et al. ..... 707/10 |
| 6,496,855 | B1| * | 12/2002 | Hunt et al. ......... 709/217 |

FOREIGN PATENT DOCUMENTS

WO    WO 95/34175    12/1995

* cited by examiner

*Primary Examiner*—Krisna Lim
(74) *Attorney, Agent, or Firm*—Nixon & Vanderhye P.C.

(57) ABSTRACT

In a communications network, each of a number of users registers user profile data in a directory. The directory is available to other users. The user profile data includes identifiers for one or more of a plurality of call control protocols. Prior to establishing a call, a user retrieves user profile data for the called party from the directory. The call is then established using a call control protocol which was identified in the relevant user profile.

12 Claims, 17 Drawing Sheets

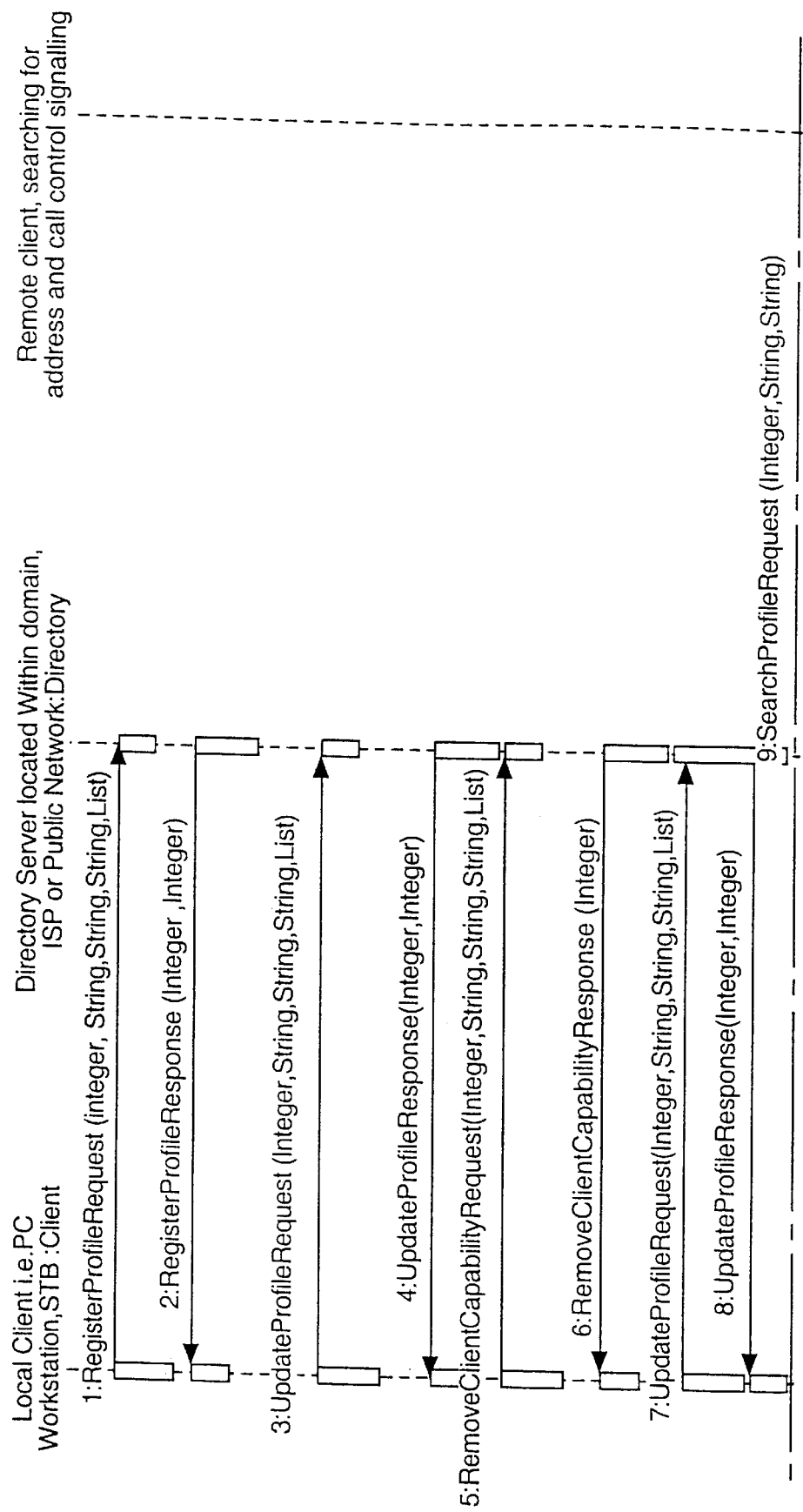

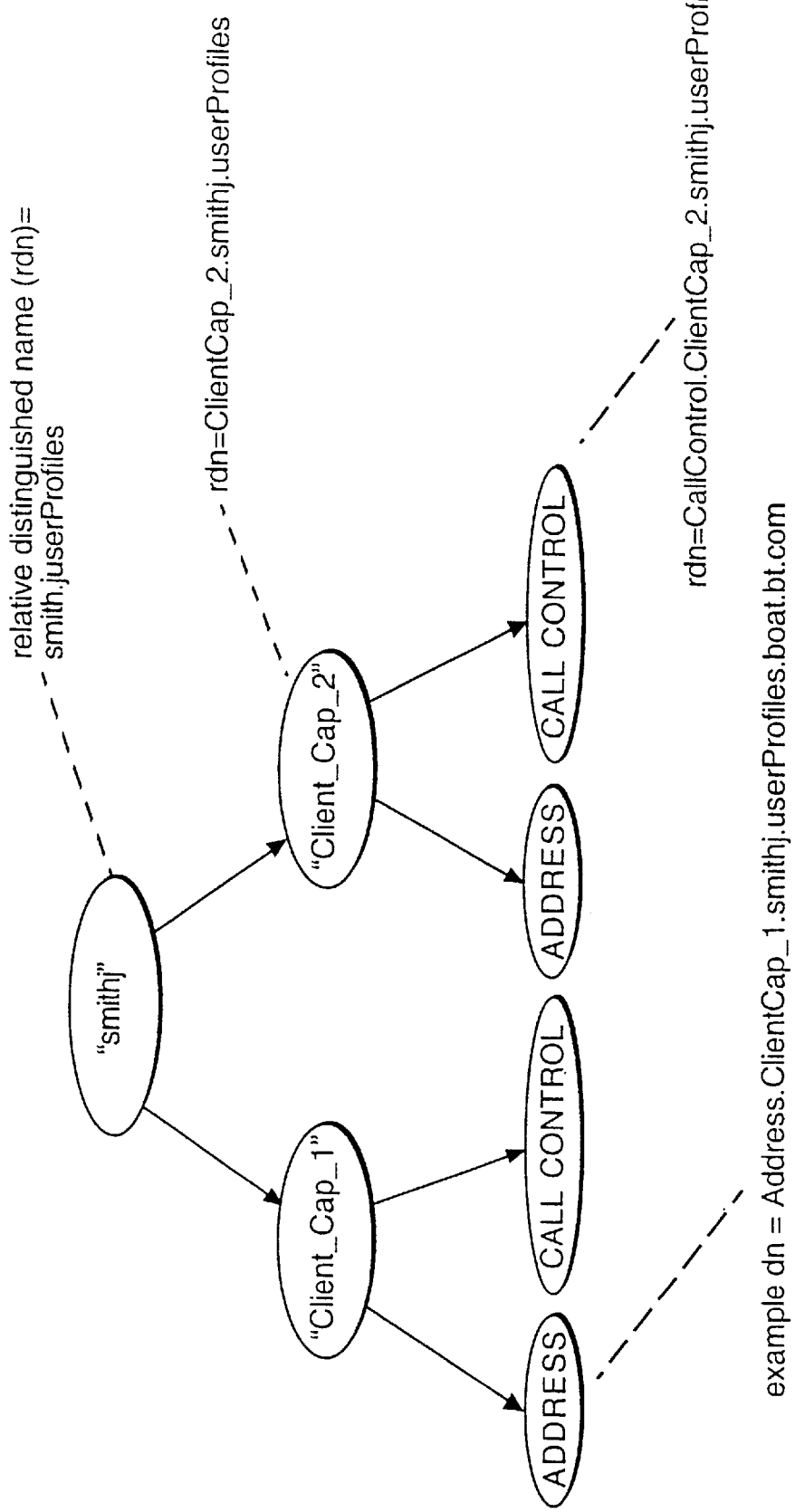

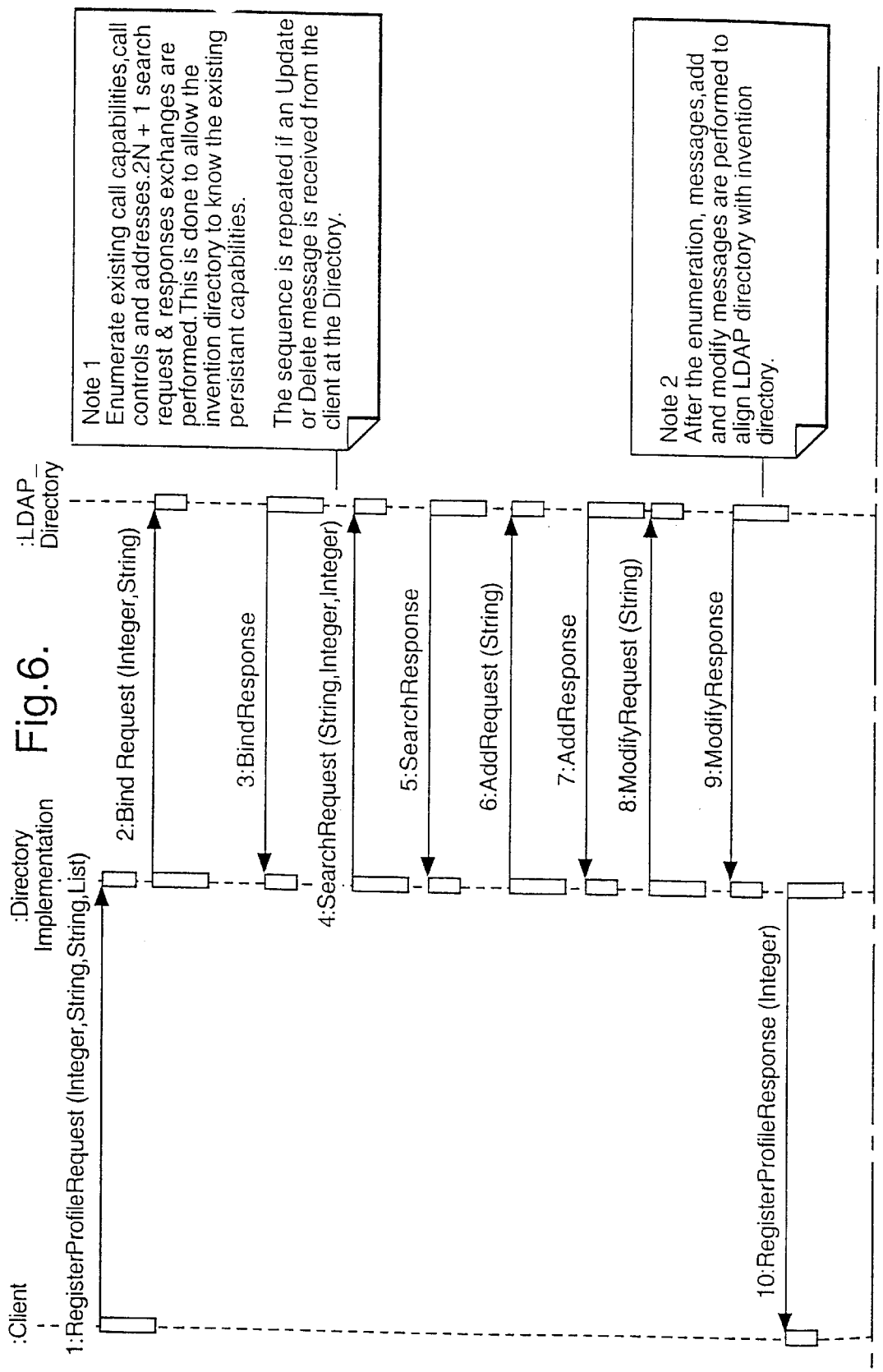

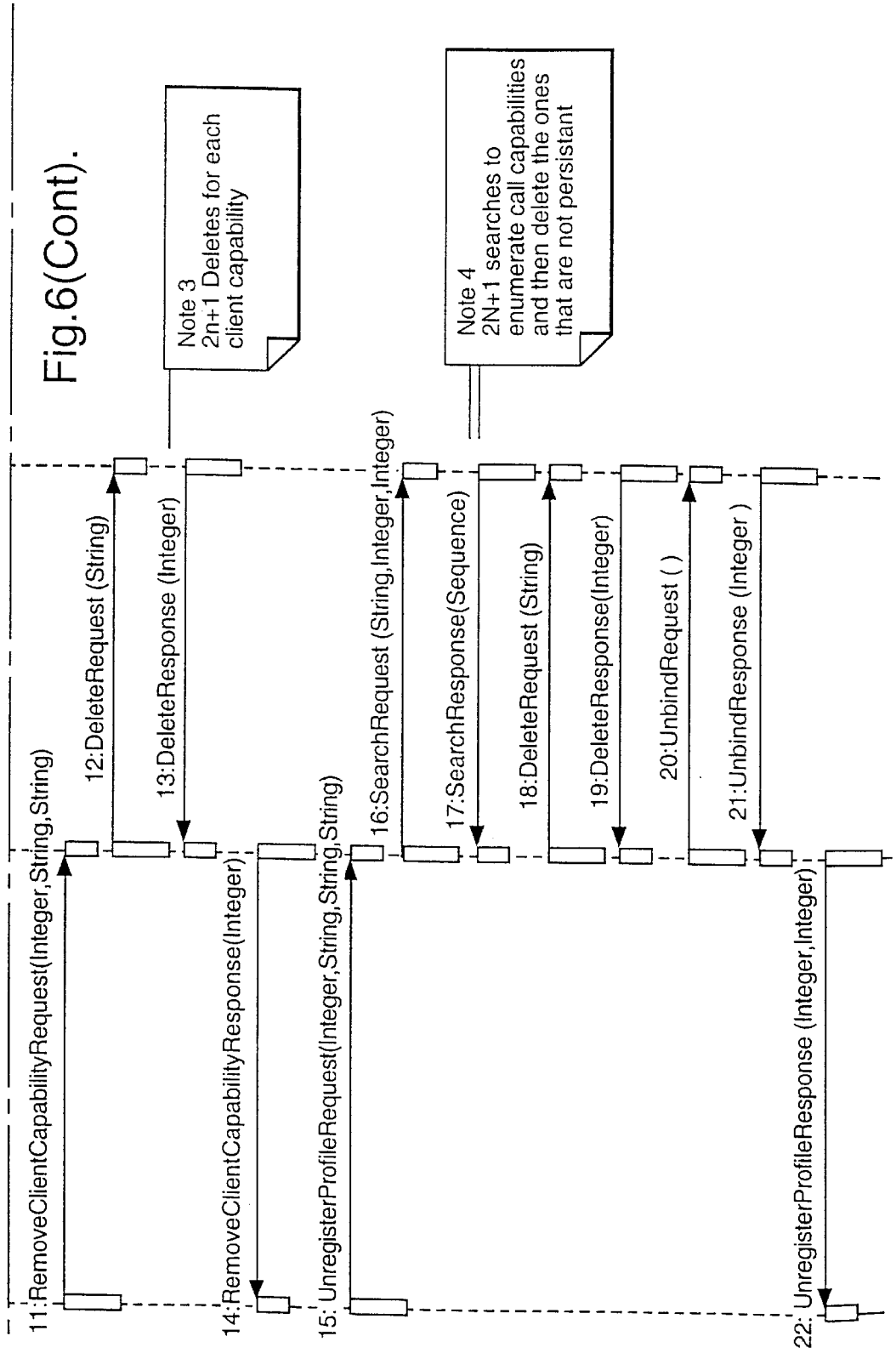

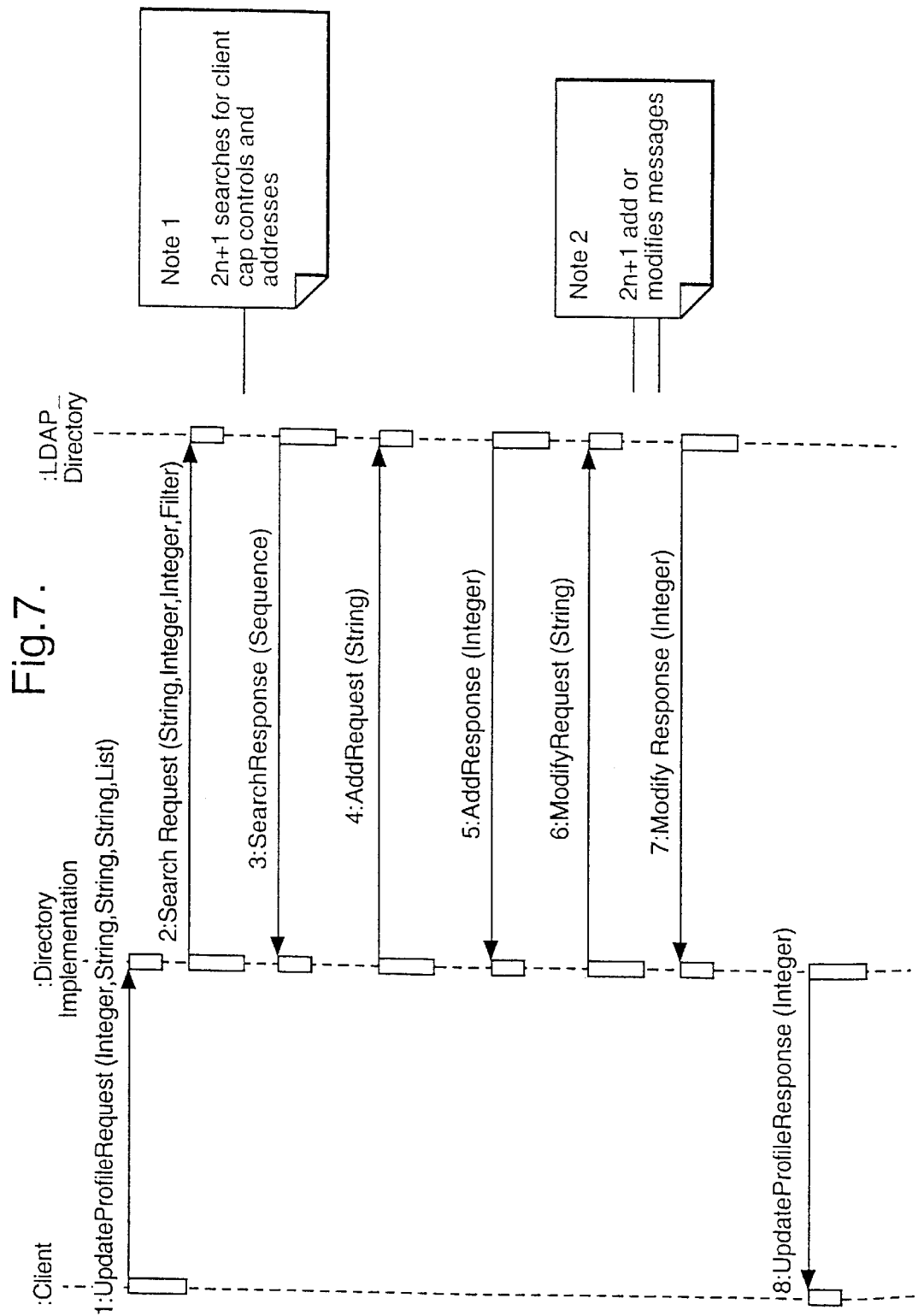

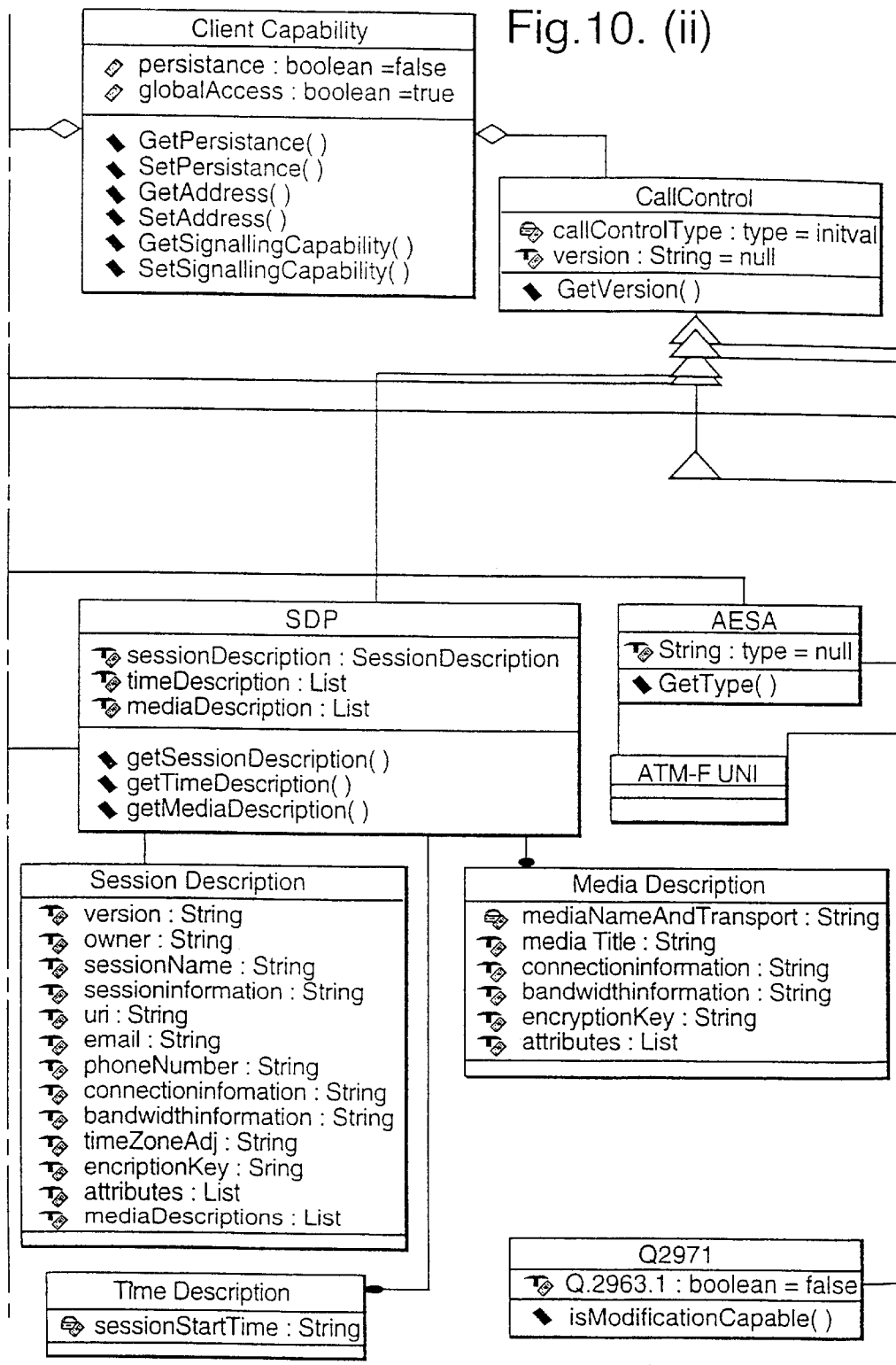
Fig.10. (ii)

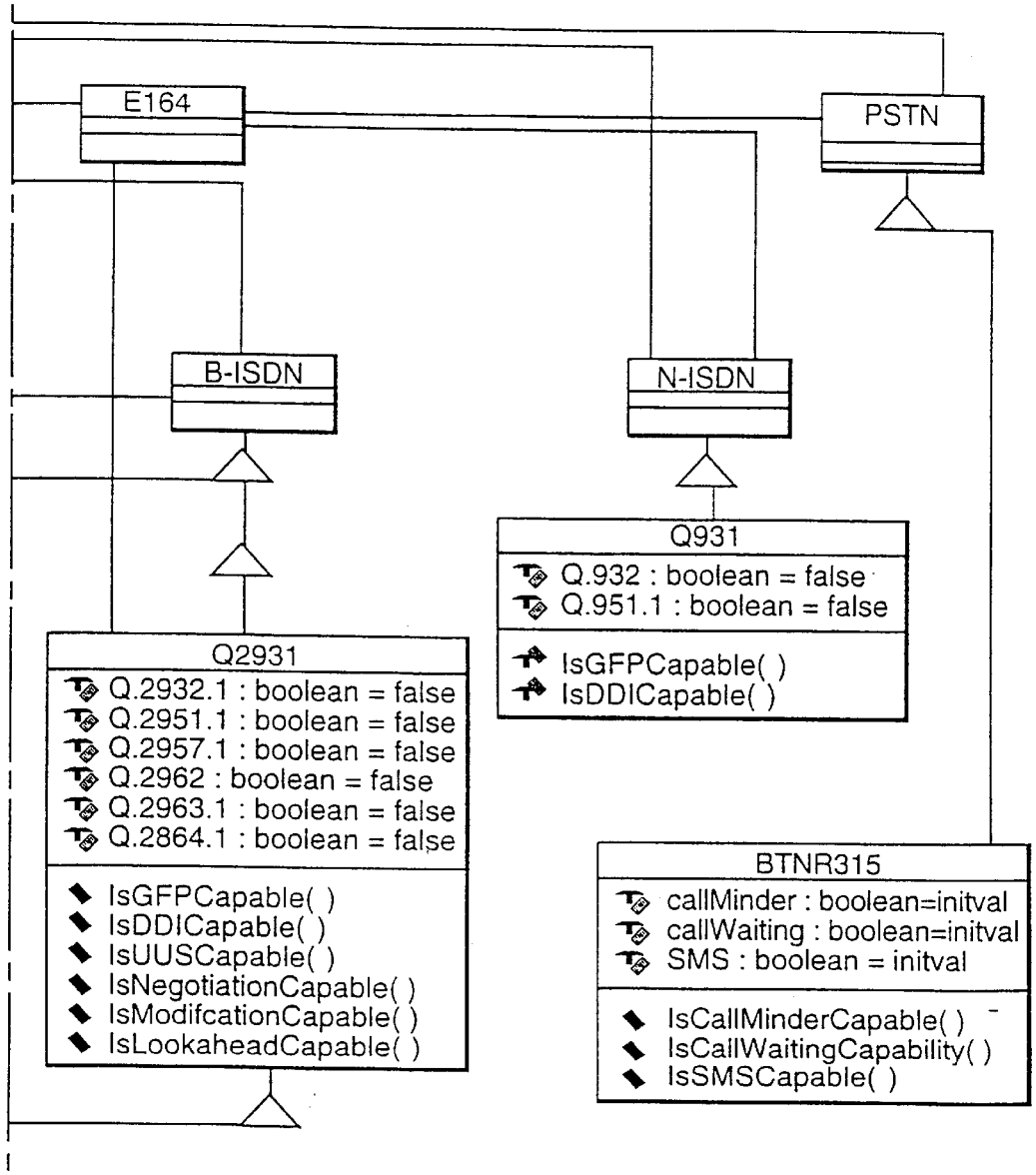
Fig.10. (iii)

COMMUNICATIONS NETWORK AND METHOD HAVING ACCESSIBLE DIRECTORY OF USER PROFILE DATA

BACKGROUND TO THE INVENTION

1. Field of the Invention

The present invention relates to a communications network, and in particular to a network in which customers use a number of different call control mechanisms.

2. Description of Related Art

In a conventional public telephone network, customers have only one type of address, namely telephone numbers, and there is a single uniform call control mechanism which is built into the telephone network and which is used for establishing and for terminating calls, and for recognising e.g. when a called party is busy. Increasingly however, customers have access to a range of different network technologies, each with its own address type. For example, a customer might have in addition to a telephone number a conventional IP (Internet Protocol) address, a multicast IP address and a URL (Uniform Resource Locator). In general, each of these different address types has associated with it a respective call control protocol (where the term "call control" is used broadly to denote the means for establishing and terminating connections between different parties). For example, audio or visual communication between parties using conventional IP addresses commonly uses the H.323 protocol, whereas for communication between IP multicast addresses a different protocol, Session Description Protocol (SDP) is used. Maintaining a one-to-one mapping between address types and call control has the advantage, that the user knows unambiguously the appropriate call control mechanism for establishing contact with a particular address. However, as new call control mechanisms have proliferated, and as existing protocols develop to offer new functionality and to harness the capabilities of increasingly sophisticated client terminals and of networks offering more bandwidth, it becomes increasingly difficult to maintain the one-to-one mapping. As a result, it has become difficult to guarantee successful call set-up based simply on knowledge of the address type of the called party.

SUMMARY OF THE INVENTION

According to a first aspect of the present invention, there is provided a method of operating a communications network comprising;

a) for each of a plurality of users connected to the network, registering user profile data in a directory which is accessible to other users, which user profile data includes identifiers for one or more of a plurality of different call control protocols;

b) prior to establishing a call from a calling party to a called party, reading user profile data for the called party terminal from the directory; and c) subsequently establishing the call using a call control protocol identified in the said user profile data for the called party.

The present invention makes it possible to dispense with one-to-one mapping of address types and call control protocols, whilst still ensuring that a calling party has all the information necessary for successful call set-up. This is achieved by recording call control capabilities for different users at client terminals in a directory which is accessed by a customer prior to attempting to set up a call. In addition to allowing flexibility in the selection of call control protocols, this arrangement also facilitates customer mobility, since a user can log on at different terminals and update the corresponding user profile accordingly.

Often, the step of registering user profile data will be carried out by the client terminal itself. For example, when the client terminal is a PC connected to a LAN, then the client terminal may register its user profile with the directory each time the user logs onto the LAN. Preferably however the method also provides for the step of registering the client profile to be carried out by a third party. The third party may for example register a conference address and a session control protocol which applies to a multiplicity of parties to a conference.

Preferably the user profile includes at least one network address for a client terminal. Preferably the user profile further comprises network driver or call control identities for each network driver used by the client terminal to access the network. Together these are known as a client capability.

Preferably the method includes registering the user profile data when a user at a client terminal logs on to a network; and maintaining a record of the user profile data after the user logs off. Preferably in this case the user profile includes a flag which distinguishes data for persistent terminal capabilities from other data, and only the said data for persistent terminal capabilities are maintained after the user logs off.

Preferably, in the step of registering user profile data, the user profile data is structured as a hierarchy of objects including a user profile parent object and at least one client capability child object. Preferably the hierarchy of objects further comprises network address objects and call control objects, which network address objects and call control objects are related to the client capability object as child objects to parent object.

The terms object, parent and child are used here and throughout the description and claims with the meanings normally assigned these terms in object oriented design/programming (OOD/OOP).

According to a second aspect of the present invention there is provided a communications system comprising:

a) a network:

b) a multiplicity of client terminals connected to the network, and different ones of the multiplicity of client terminals having different call control capabilities;

c) a directory which is accessible to the multiplicity of client terminals and which is programmed with user profile data for users of the client terminals, which user profile data includes, for each user, identifiers for one or more of a plurality of call control protocols.

The directory may be located entirely on a server which is remote from the client terminals and which is accessed via the network. Alternatively the directory may comprise directory system proxies located locally at respective client terminals and a database which is located remotely from the terminals and which is accessible via the directory system proxies.

BRIEF DESCRIPTION OF THE DRAWINGS

Systems and methods embodying the present invention will now be described in further detail, by way of example only, with reference to the accompanying drawings, in which:

FIG. 4 is a diagram showing a user profile object;

FIG. 6 is a second message flow diagram;

FIG. 7 is a third message flow diagram;

DETAILED DESCRIPTION OF EXEMPLARY EMBODIMENTS OF THE INVENTION

Figure 1:
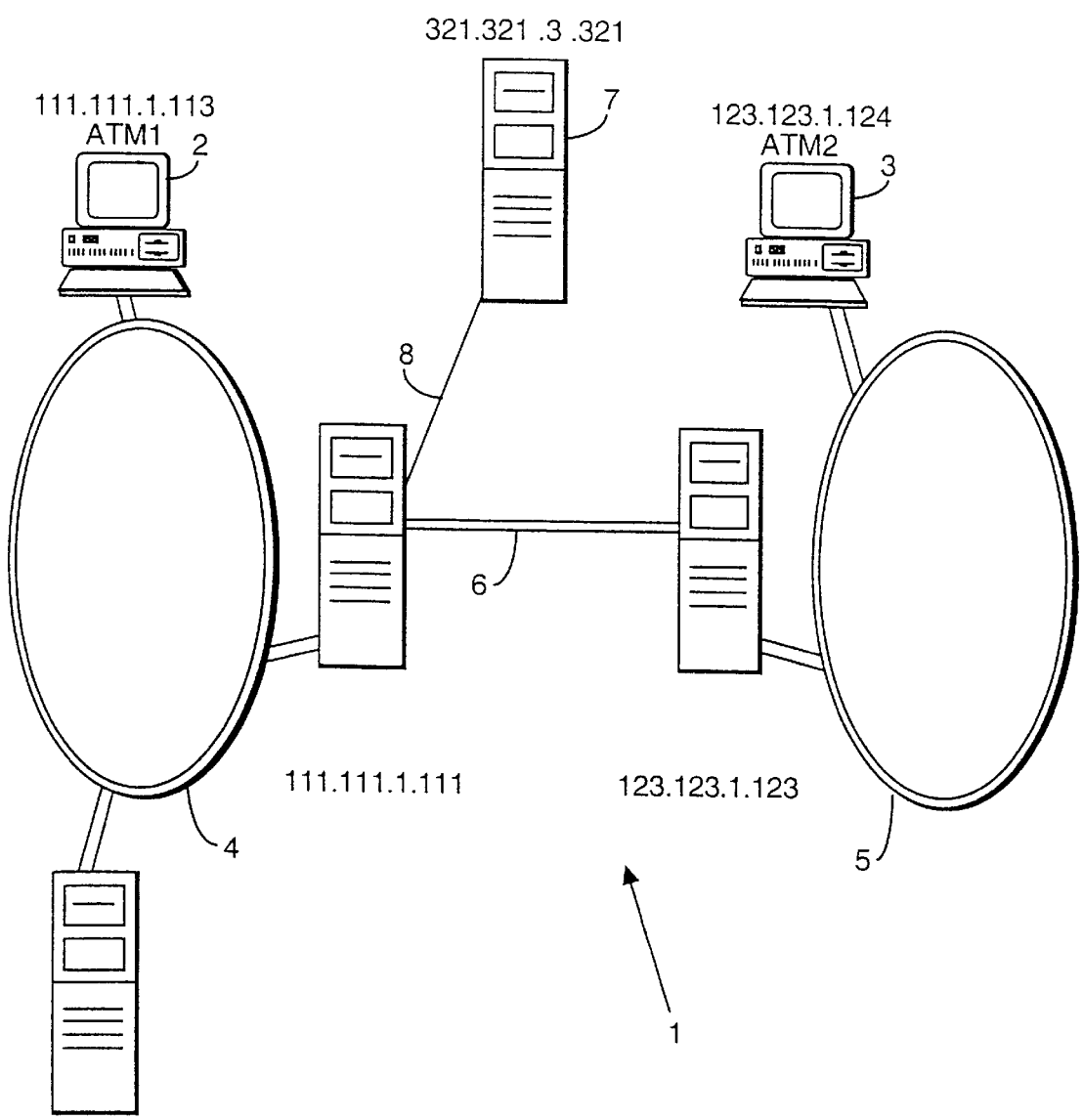
FIG. 1 is a schematic of a first network embodying the present invention.

In FIG. 1, a communications network 1 includes user terminals 2, 3 connected to different respective network domains 4,5. In this example, the user terminals 2,3 are computer workstations. The network domains in this example are broadband networks which support both ATM (asynchronous transfer mode) and IP (Internet Protocol) transmission protocols. The first user terminal has both an Internet address (111.111.1.113) and an ATM address (ATM1). Similarly, the second user terminal has an Internet address (123.123.1.124) and an ATM address (ATM2). The network domains are linked by a connection 6 which also supports both of these protocols. A directory platform is linked by an IP data connection 8 to the first network domain 4 and via the first network domain 4 to the second network domain 5. The directory platform has an IP address 321.321.3.321.

In use, customers at user terminals 2,3 both register with a directory server which, in this example, runs on the directory platform 7. Subsequently, as will be further described below, when a customer at user terminal 2 wishes to contact the customer registered at user terminal 3, then a request is submitted to the directory server. This request is transmitted to the IP address of the directory platform 7. The request includes data, such as the customer name, which identifies the called customer. The directory server uses this data to select a corresponding user profile which was created when the customer registered with the directory server. From the selected user profile the directory server returns to the calling customer the network addresses and call control capabilities of the called customer. Using this information the calling customer sets up a call to the other customer. For example, the calling customer in this instance may choose to establish a connection to the ATM address (ATM2) using the ATM call control protocol (Q.2931).

The steps of the protocol outlined above, which is termed the "heterogeneous directory protocol" (HDP), will now be described in further detail.

Registering Client Profiles

When registering with the directory server, the client enumerates its network drivers, call control capabilities and network addresses. By way of example, these may include:

A network driver could be an ATM card, a Windows socket API, a telephone line driver.

Call control can be the ISDN series Q.931 or Q.2931, H.323, H.310, PSTN, IP unicast or IP multicast.

The network addresses could be AESA, IP or E.164 Telephone number.

A model of the client's call control capabilities and network address resources is registered with the directory server. The directory server then assumes that the client is registered and that is active. When the client is not active, existing details may be stored on the directory server. The existing details record other methods of making calls or passing messages to the client. These details may include a URL (uniform resource locator), PSTN (public switched telephone network) number or Email address. This static information is updated with any relevant changes notified by the client when the client registers. The URL may be used as a pointer to an HTML page containing details of further special resources, such as a conferencing capability, associated with the user. The HTML page could additionally be used to access Java call control applets. An indication of the nature of these resources may be stored with the URL and made available to other users as part of the user profile.

There are two possible ways of registering client capabilities. The first way is for the client itself to register its own capabilities. Only addresses and technologies that are associated with the client at the time of registration are permitted to be registered. The second way is to allow clients to register capabilities of clients other than themselves. An example of this would be the advertisement of a conference address and associated call control protocol by a third party. These two methods for registering client capabilities may also be used to update, remove and unregister client capabilities.

The directory server uses an hierarchical model to store the information registered by the client. By traversing the model it is possible to find client details and their associated capabilities. The directory can be accessed by many mechanisms, such as the Internet, B-ISDN's (broadband Integrated Services Digital Network) Generic Functional Protocol and MF4 tones and announcements. Clients access their local directory server using a pre-defined call control protocol and network address, such as TCP and an IP address.

Figure 2:
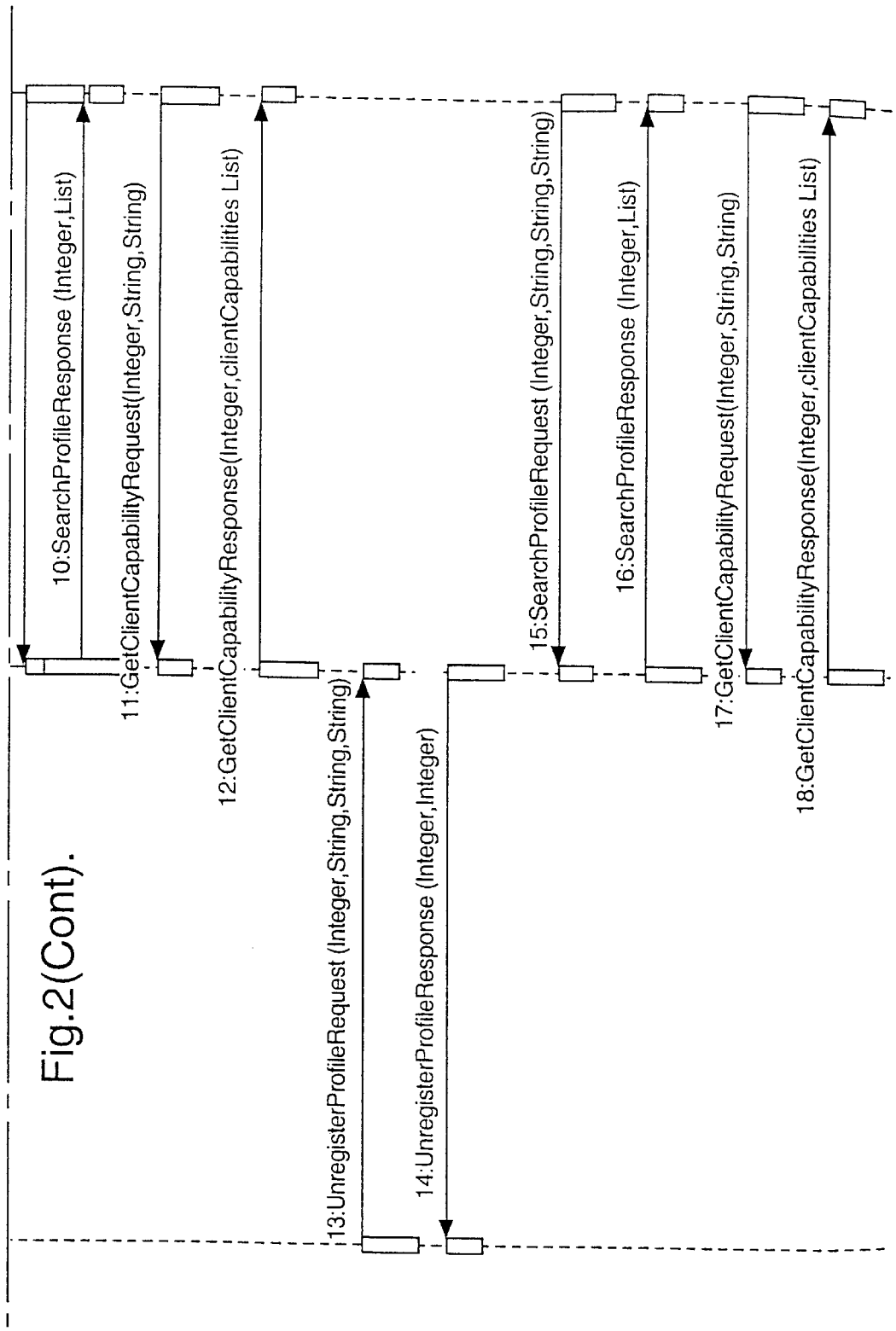
FIG. 2 is a first message flow diagram.

The registration process is illustrated in message sequences 1 and 2 of FIG. 2. The RegisterProfileRequest message is used to indicate to the directory system that the client is now active. In addition, it can inform the directory system of any new capabilities that have become available as a result of the client becoming active. On receipt of the RegisterProfileRequest message the directory system authenticates the client and any associated request. Assuming the request is valid, the directory system updates itself and sends a RegisterProfileResponse back to the client.

Modifying Client Profiles

While the client remains active it may add, modify or remove client capabilities stored on the directory system. This may be necessary, for example, if the client obtains new call control technology or a new network address. The UpdateProfileRequest message, shown in message sequences 3 & 4 in FIG. 2, is used to add or modify client capabilities. The parameters passed in this message determine whether a new client capability is added to the directory system or an existing client capability on the directory system is modified. In this implementation, the address and call control fields form the client capability primary key for the directory system. Hence, if both the address and call control parameters passed in the UpdateProfileRequest message match an existing client capability primary key in the directory system the message is used to modify other parameters belonging to that client capability. If no match is found, the message is used to create a new client capability in the directory system. Again, assuming the request is valid, the directory system updates itself and sends a UpdateProfileResponse back to the client.

The RemoveProfileRequest message, shown in message sequences 5 & 6 in FIG. 2, is used to remove client capabilities from the directory system. If both the address and call control parameters passed in the RemoveProfileRequest message match an existing client capability primary key in the directory system, then the matched client capability is deleted from the directory system. If no match is made an error is assumed, the result of which error or otherwise is returned to the client using the RemoveProfileResponse message.

Unregistering Client Profiles

When a client becomes idle, for example when a user logs off his/her office computer, the client undergoes the unregistration procedure illustrated in message sequences 13 and 14 of FIG. 2. The UnregisterProfileRequest message is used to indicate to the directory system that the client has moved from the active state to idle. On receipt of this message the directory system authenticates the client and assuming the request is valid, the directory system updates itself and sends a UnregisterProfileResponse back to the client. As part of the directory system update, all client capabilities indicated as not being persistent are removed from the directory. Other client capabilities such as Email accounts and URLs, which do not need call control, are maintained on the directory.

Searching for Client Profiles

The client first accesses the network directory using a search criteria such as familiar name, e-mail address or URL. The directory returns a set of information containing addresses and call control capabilities, etc. that match the search criteria. The search procedure is illustrated in message sequences 9 and 10 of FIG. 2. The SearchProfileRequest message can be used to pass parameters such as the client's distinguished name, the client's domain name and/or the client's familiar name. At least one of these parameters must be passed to the directory system. On receipt of the request, the directory system searches for clients that match all the parameters passed to it. All matched clients are indicated to the remote client using the SearchProfileResponse message. In addition to the list of matches passed to the remote client, a summary for each matched client is also sent back.

This procedure can be used regardless of whether the clients being searched for are active (registered) or not (unregistered).

Getting Client Capabilities

By passing a unique identifier to the directory system, the capabilities of the client identified are returned to the requesting client. All global client capabilities are returned. Non-global client capabilities are returned only if the requesting client belongs to the same domain as the client whose details are being requested. The client then chooses an appropriate call control method to initiate the call.

This procedure is shown in message sequences 11 and 12 of FIG. 2. The GetClientCapabilityRequest message is sent to the directory system. It contains the client's distinguished name and the client's domain name. These two parameters uniquely define the client. Assuming this client is stored in the directory system, the list of client capabilities for this client is passed to the remote client in the GetClientCapabilityResponse message.

This procedure can be used regardless of whether the client being scrutinised is active (registered) or not (unregistered).

Figure 3:
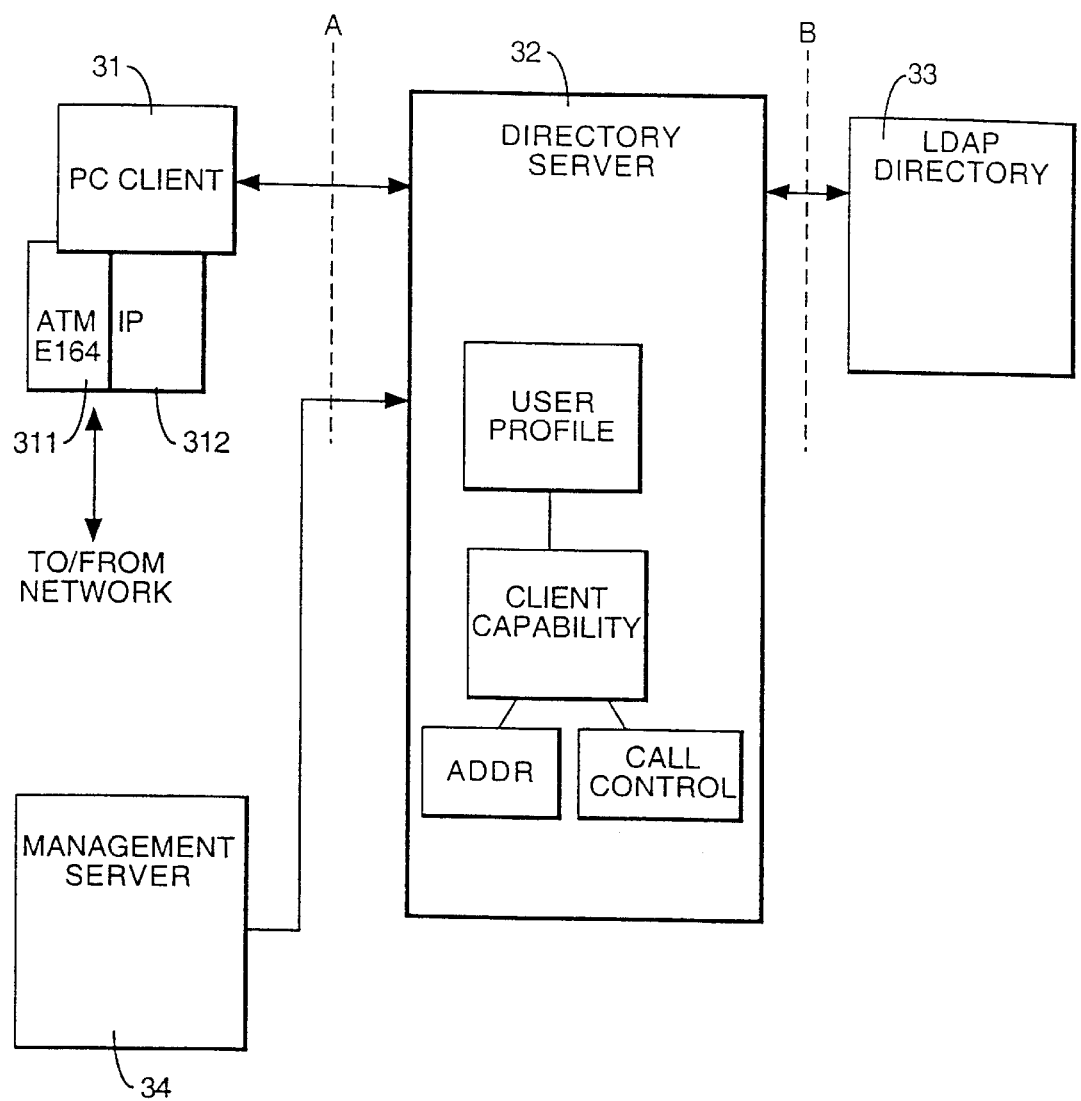
FIG. 3 is a schematic showing platforms for use in the network of FIG. 1.

FIG. 3 shows schematically the principal components of a system implementing the above protocol. The protocol is implemented across the interface referenced A, between a client terminal 31 and a directory server 32. The client in this example is a personal computer which includes an ATM driver 311 and an IP driver 312. Within the directory server 32, the data supplied by clients as they register is stored as a structured hierarchy of objects. The parent object corresponds to the user profile. There is associated with each user profile one or more client capability objects. Each client capability object has child objects including an address object and a call control object. Although in the diagram only a single instance of each object is shown, in reality the directory server includes many user profile objects, and each user profile may contain several client capabilities. A management server 34 also has access to the directory via the interface A. The management server 34 may be used, for example, to change the values of addresses in certain user profiles so that the routing adopted to a particular user varies according to the time of day. Alternatively, time-dependent settings may be specified directly by the user. In either case, this facility may be used, for example, to set a network address value to correspond to an office-based terminal during office hours, and subsequently to a home terminal outside office hours. The management server may also modify address values stored in user profiles in response to a network failure. This then prevents congestion from unsuccessful call attempts.

The objects referred to above determine how the data is registered, modified or accessed. In this implementation the data is stored in an LDAP (Lightweight Database Access Protocol) directory. LDAP is used across the interface referenced B in the Figure. LDAP is a flexible system for storing any flat data within a Data Information Base (DIB). The classes used to implement the present invention are at some time read from, written to and modified within an LDAP DIB. The DIB does not replicate class formats directly but it can store records in relative order and provide identifiers. For instance, when an address record is retrieved from the DIB, the address type can be queried to find for example that the class is an AESA Address. An empty AESA class can then be populated with the data. Likewise, when a class is to be written to the DIB, the class type will cause an identifier to be set in the DIB record for example that a record is a CallControl Q.2931 subclass.

FIG. 4 is a simple schematic for storing user profile, client capabilities, addresses and call controls. For example, an organisation such as BT may publish all its user profiles under the distinguished name (dn) of userProfiles.boat.bt-.com. To perform an LDAP search to retrieve "John Smith" UserProfile the base object to begin the search would be "userProfiles.boat.bt.com", with a filter specifying either the userName "smithj" or familiarName "John Smith". The search would return matching UserProfiles. The summary text is examined by the user to identify the correct record. Once the UserProfile record is identified, the directory implementation can then perform a search for client capabilities using the base object "smithj.userProfiles", which will return a list of ClientCapabilities records. Searches can then be performed using "Client_Cap_1", "Client_Cap_2" etc., as the base object to extract Address and CallControl Objects.

Table 1 below lists LDAP records used to implement the invention.

TABLE 1

| Class | LDAP Record |
|---|---|
| UserProfile | familiarName: String |
| | distinguishedName: String |
| | domainName: String |
| | summary: String |
| | password: String |
| ClientCapability | persistance: boolean |
| | globalAccess: boolean |
| Address | addressType: Integer = 0 |
| IP | addressType: Integer = 1 |
| | version: String |
| Multicast | addressType: Integer = 2 |
| | version: String |
| | timeToLive: Integer |
| Unicast | addressType: Integer = 3 |
| | version: String |
| E164 | addressType: Integer = 4 |
| | version: String |
| AESA | addressType: Integer = 5 |
| | version: String |
| | type: String |
| CallControl | callControlType: Integer = 0 |
| | version: String |
| H225 | callControlType: Integer = 1 |
| | version: String |
| SDP | callControlType: Integer = 2 |
| | version: String |
| BISDN | callControlType: Integer = 3 |
| | version: String |
| ATMFUNI | callControlType: Integer = 4 |
| | version: String |
| Q2931 | callControlType: Integer = 5 |
| | version: String |
| Q2971 | callControlType: Integer = 6 |
| | version: String |
| NISDN | callControlType: Integer = 7 |
| | version: String |
| Q931 | callControlType: Integer = 8 |
| | version: String |
| PSTN | callControlType: Integer = 9 |
| | version: String |
| BTNR315 | callControlType: Integer = 10 |
| | version: String |

Figure 5A:
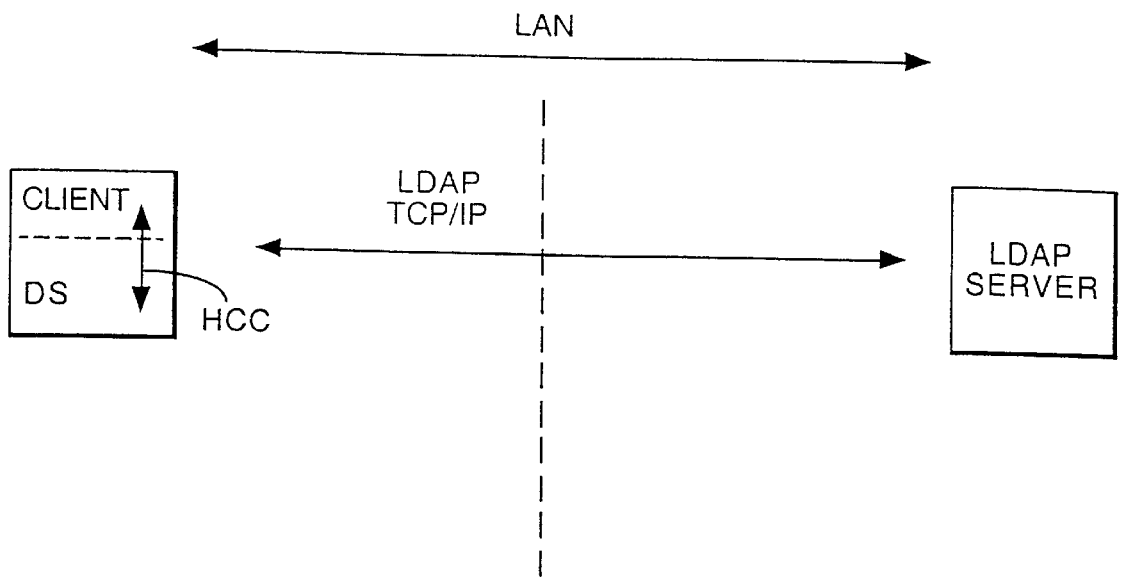
FIGS. 5a & 5b are diagrams showing alternative LDAP implementations of the invention.
Figure 5B:
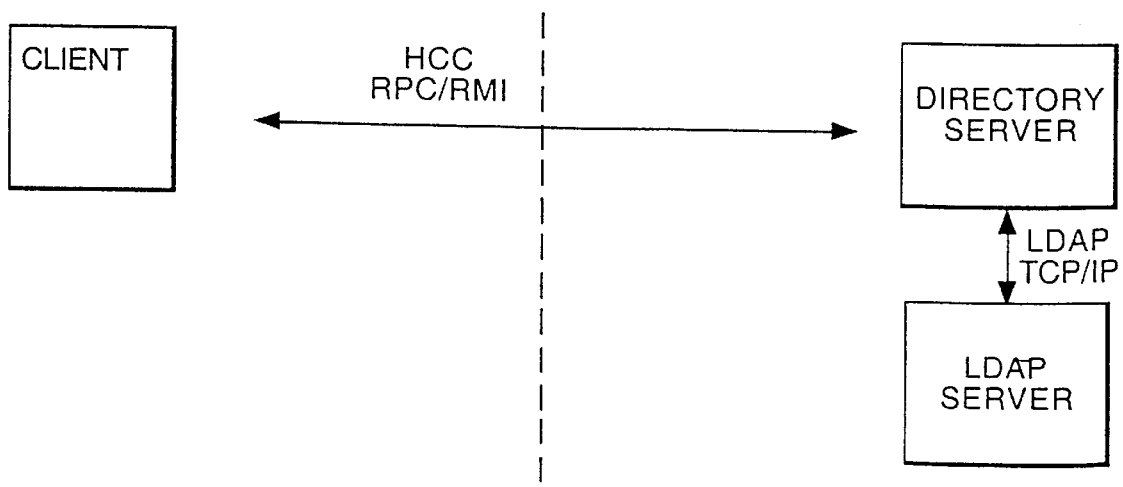

FIGS. 5a and 5b show alternative approaches to constructing an LDAP implementation. FIG. 5a uses a local directory system proxy. In this system, a directory system object (DS) exists on the client. When the client object communicates with the directory it uses a standard Application Programmers Interface (API), examples ranging from C and Java to remote procedure calls. The directory class then acts as a proxy converting the protocol messages such as RegisterProfile and SearchProfile into LDAP messages. The LDAP messages are then sent using Internet Protocol via a LAN to the LDAP server, where they are applied and responded to.

One benefit of this approach is that all operations can be performed on a standardised LDAP address and port number. To implement the system only the client application needs to be updated, whilst on the LDAP server, only the database needs populating.

The approach illustrated in FIG. 5b uses a remote directory system proxy. In this system the client object communicates with the Remote Directory System Proxy using the HDP protocol of the present invention over either a Remote Procedure Call (RPC) for C interface or Remote Method Invocation (RMI) for Java interface. The client object must know the IP address and port to send the requests to. It must also register a port for receiving responses. The remote directory server then converts the HDP protocol as described above with reference to FIG. 2 into LDAP messages. In this approach, the Directory Server and LDAP server may run on a single platform, or alternatively may each have a dedicated platform.

Figure 8:
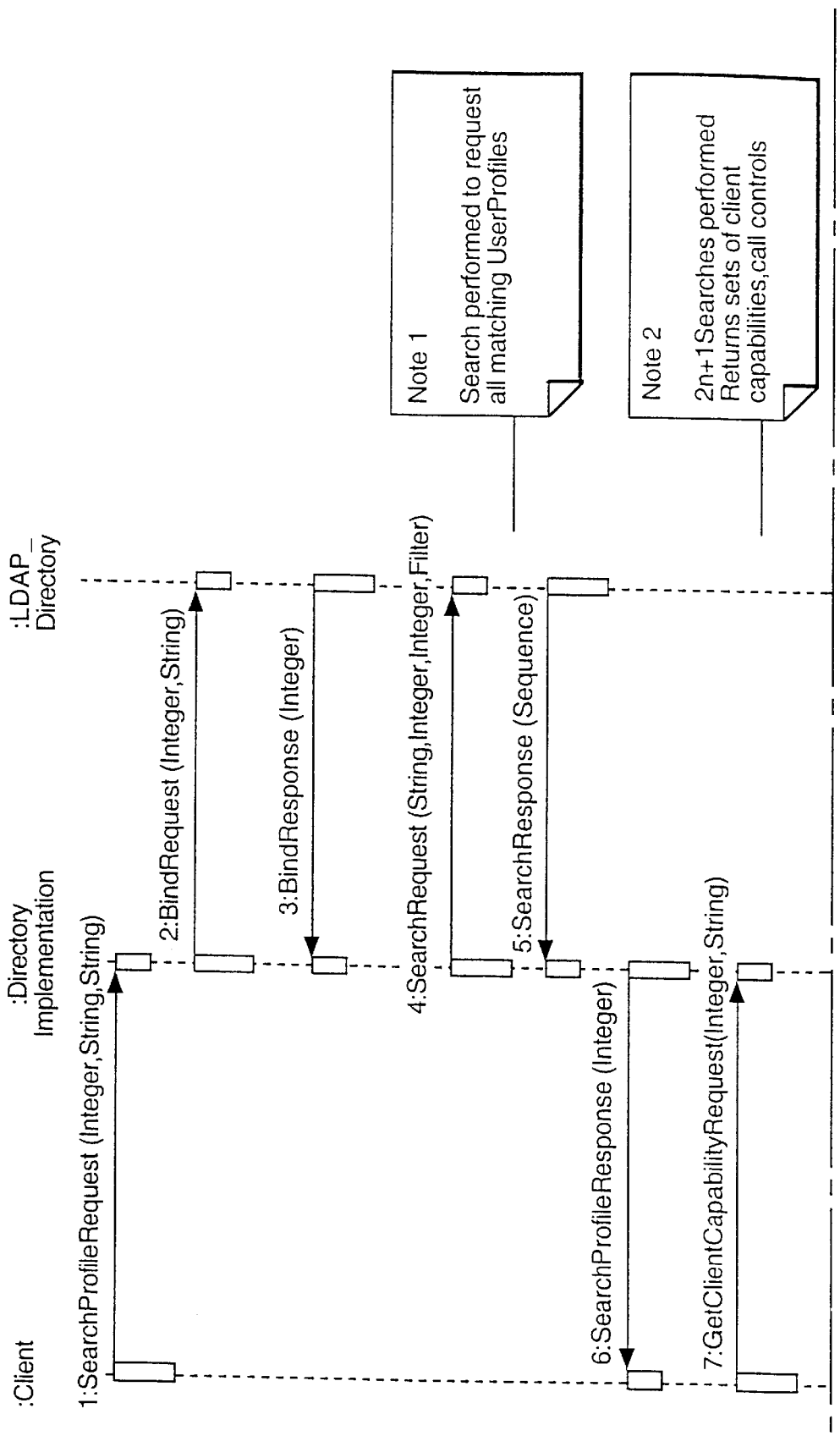
FIG. 8 is a fourth message flow diagram.
Figure 8:
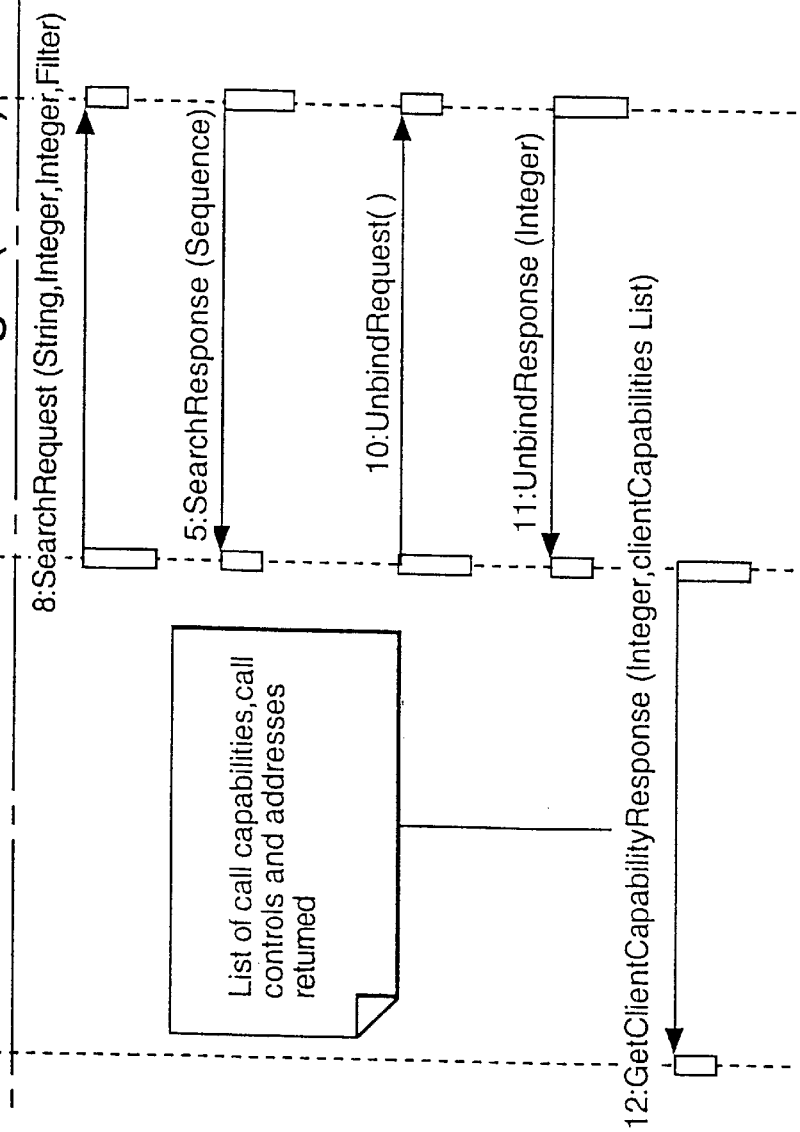

FIGS. 6, 7 and 8 show LDAP and HDP message flow protocols for an LDAP implementation of the invention. FIG. 6 relates to the registering/unregistering of a profile; FIG. 7 shows the updating of a user profile and FIG. 8 shows the message flows when a client requests a user profile for a called party in order to set up a call.

Figure 9A:
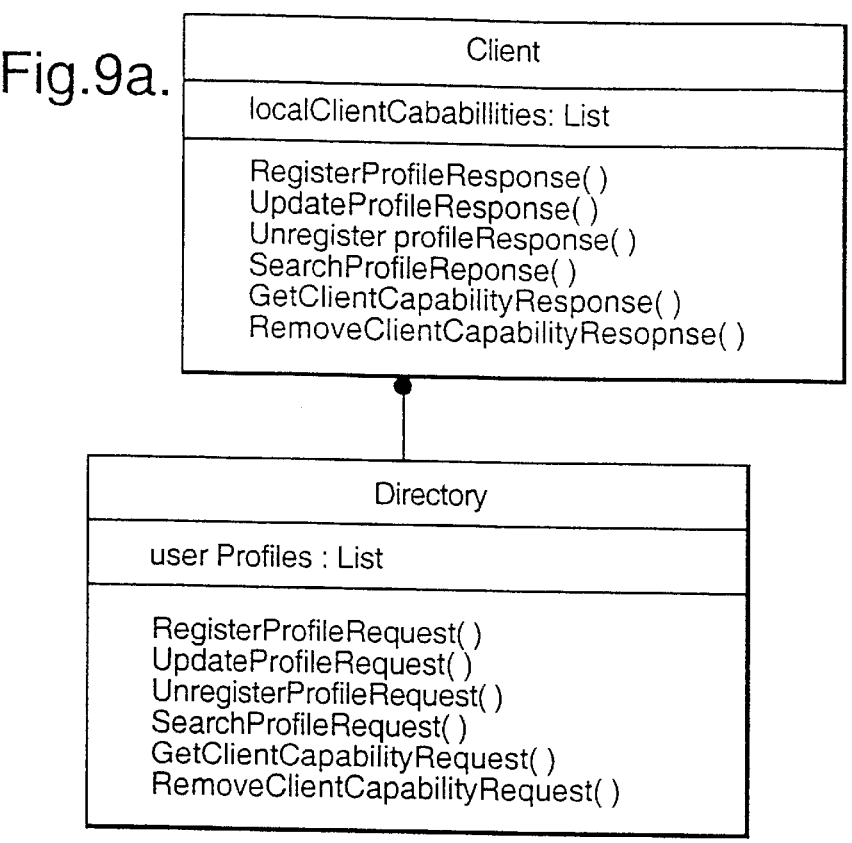
FIG. 9a, 9b and 9c are diagrams showing classes used in implementing a protocol embodying the invention.
Figure 9B:
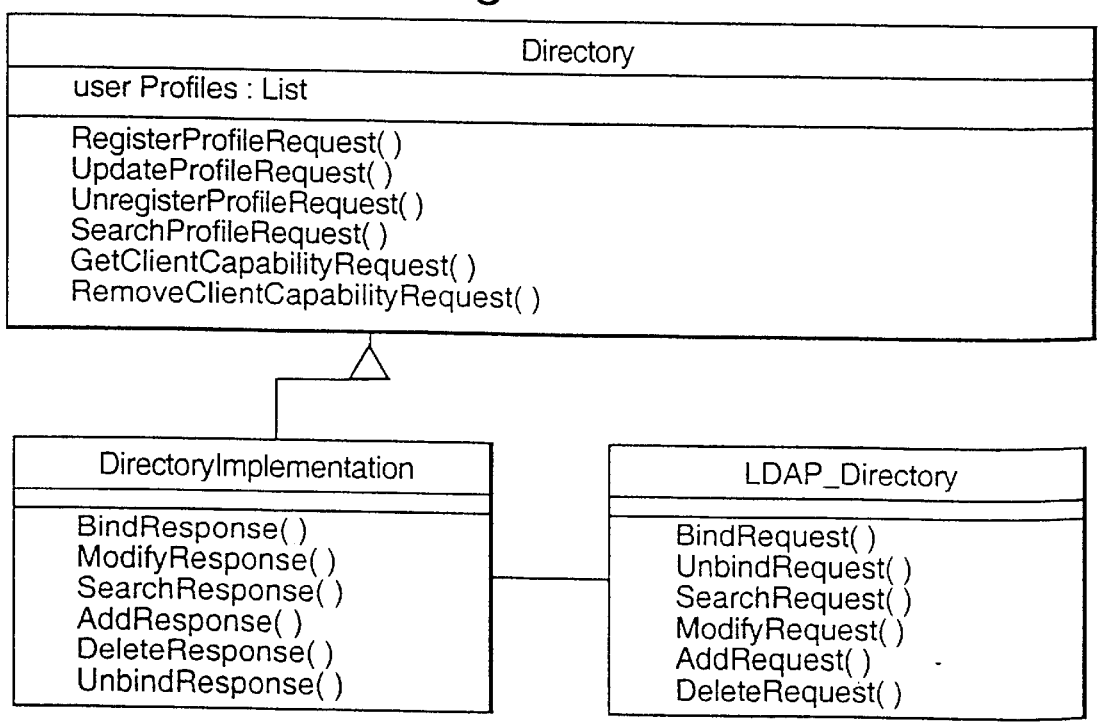
Figure 9C:
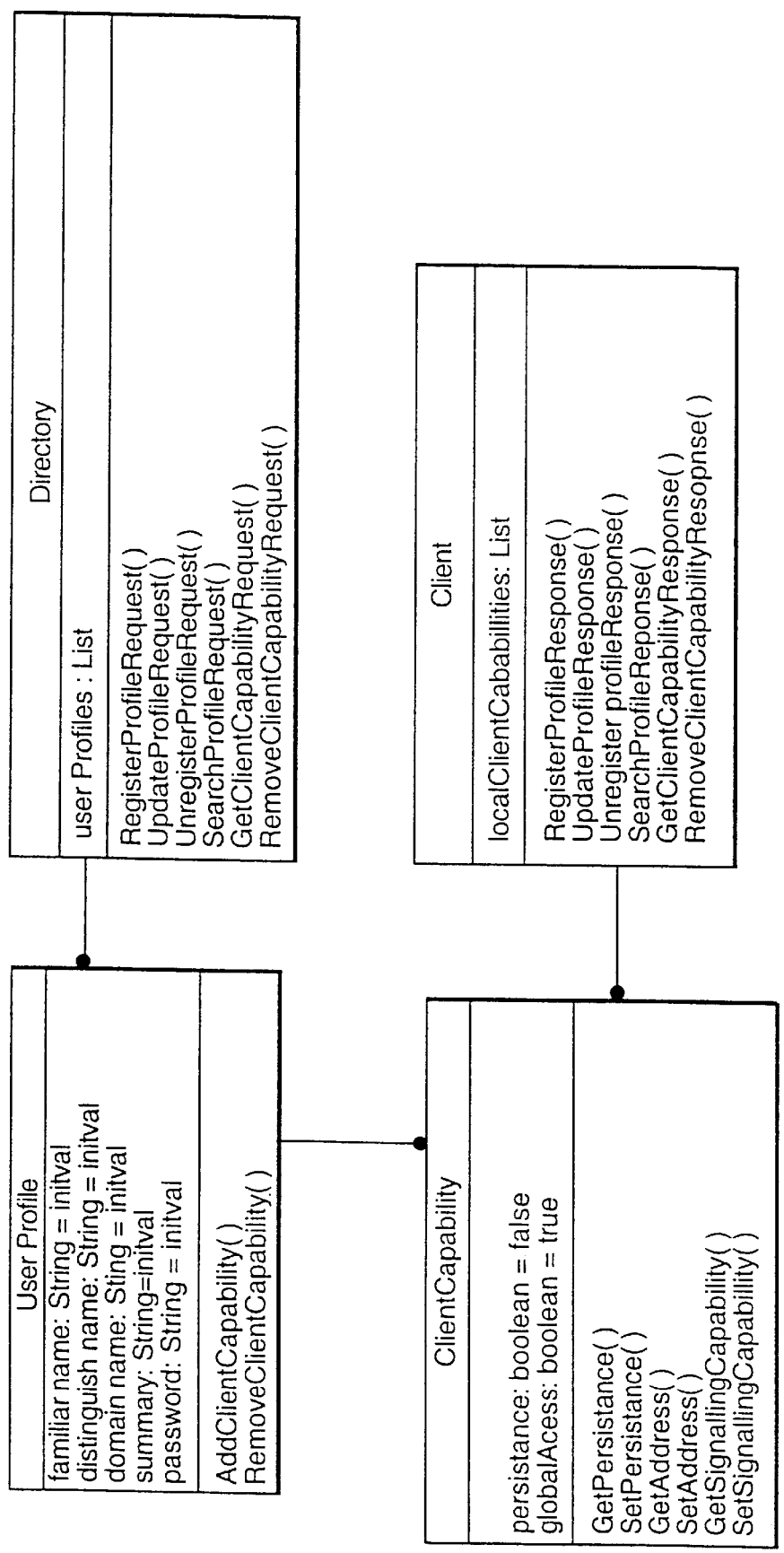
Figure 10:
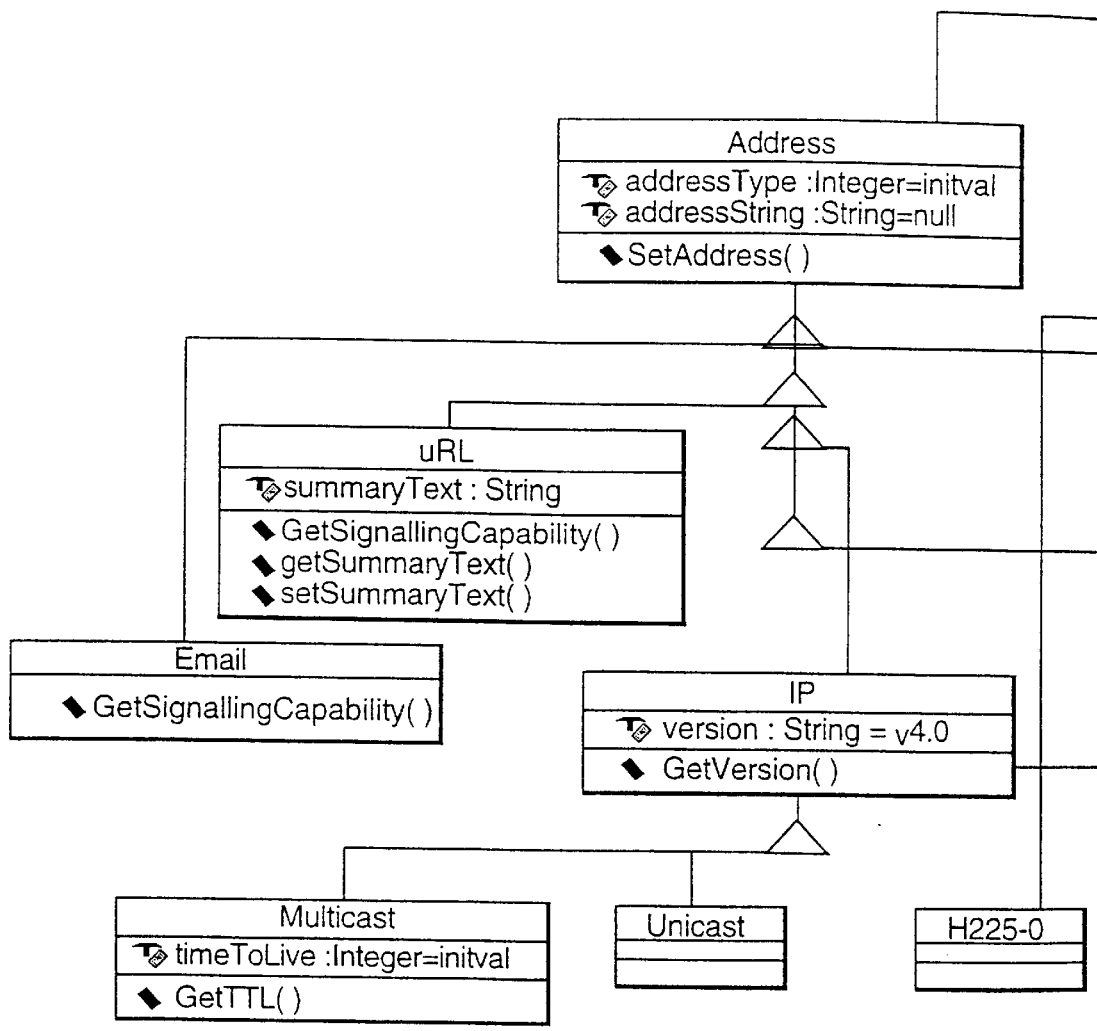
FIG. 10 is a diagram showing in further detail classes used in implementing a protocol embodying the invention.
Figure 11:
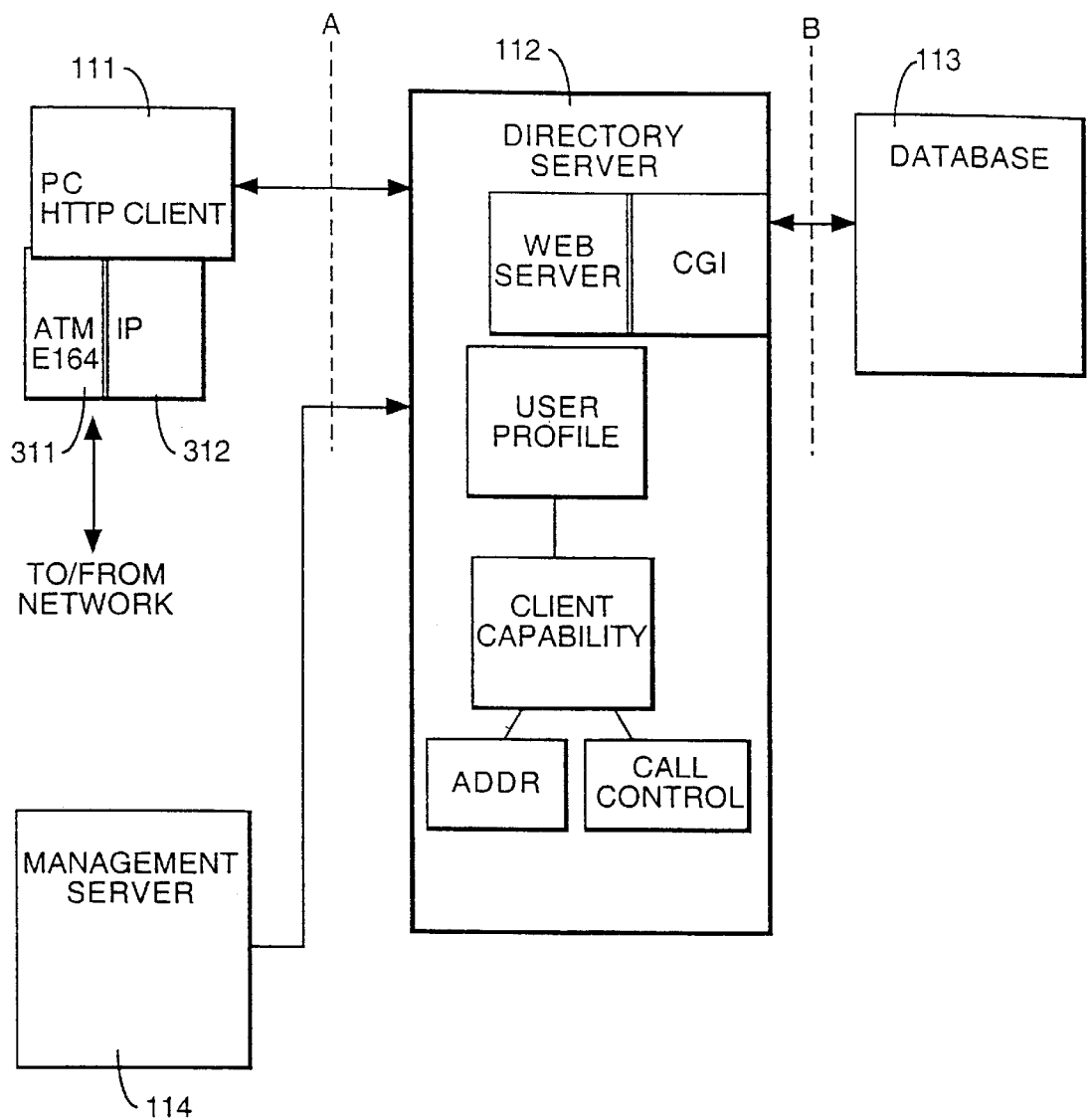
FIG. 11 is a schematic showing platforms for use in an alternative embodiment.

FIGS. 9a, 9b, 9c and 10 show classes representing the principal components used in implementing the invention. The diagrams are generated using the Rational ROSE (Rational Object-oriented Software Engineering) software tool, which is available commercially from Rational Software Corp. of Santa Clara, Calif. Using that tool the class structures shown can be compiled to generate code templates for use in implementing the HDP protocol. All that the programmer would then need to do is to create state diagrams from the message flows and add the appropriate state transitions to the code. Alternatively, equivalent features may be programmed using any one of a number of suitable programming languages, such as Java or C ++, well known in this field. The client class shown in FIG. 9a models the local client terminal and the access from that terminal to the directory system. It represents capabilities which are local to the client terminal. The directory class represents the directory server. This class may be inherited and specialised to allow implementations using different proprietary data interfaces, such as LDAP in the implementations discussed above, or HTTP in the implementation described below. FIG. 9b shows the directory implementation as an aggregation of directory and the relationship between the directory implementation and the LDAP directory. FIG. 9c shows the user profile and client capability classes in addition to the directory and client classes. The user profile captures the user's details, as previously described. A User Profile may have many client capabilities. The Client Capabilities have two additional fields, those of Persistence and Global Access. Persistence allows a Client Capability to be marked such that when a user logs off a machine, it may remain within the directory system. Most local capabilities are set to be non-persistent, examples of persistent capabilities are those of email address or mobile phone number. Global Access allows a Client Capability to be marked such that clients belonging to a different domain may access it using the Get Client Capability procedure. FIG. 10 shows in further detail objects derived from the Client Capability class. The client capability object represents the aggregation of network address and call control capabilities, both of which are ultimately associated, e.g. E.164 address and Q2931 call control. The invention may be implemented using interfaces other than LDAP. FIG. 11 shows an embodiment in which the HTTP and CGI are used to provide an interface implementing the HDP protocol. To allow a user to perform the functions within the protocol a home page is defined with buttons and CGI scripts as a front end to the directory system 112. The CGI scripts access a database 113 implemented using commercially available database tools such as ORACLE (trademark) in combination with a web server such as ORACLE Web Server (trademark). Via this interface a user running an HTTP client on a terminal 111 can register name, password and associated client capabilities, make changes to the profile and finally unregister at the end of their session. As in the previously described embodiments, a management server 114 may also access the database.

What is claimed is:

1. A method of operating a communications network, comprising;
   a) for each of a plurality of users of the network, storing user profile data in a directory, which is accessible to other users of the network, the user profile data including identifiers for one or more of a plurality of different call control protocols, wherein at least one of the identifiers is for a call control protocol which is designated as being non-persistent;
   b) prior to establishing a call from a calling party to a called party, determining if the called party is logged into the network and if so making available to the calling party all of said identifiers whereas if the called party is not determined to be logged into the network, making available to the calling party all of the identifiers except the at least one identifier designated as being non-per-sistent; and
   c) subsequently establishing the call using a call control protocol by the identifier or identifiers made available to the calling party in step b).

2. A method according to claim 1, in which the user profile data includes at least one network address for a user terminal.

3. A method according to claim 1, in which the user profile data further comprises network call control identities for each network driver used by a user to access the network.

4. A method according to claim 1, in which in the step of storing user profile data, the user profile data is structured as a hierarchy of objects including a user profile parent object and at least one client capability child object.

5. A method according to claim 4, in which the hierarchy of objects further comprises network address objects and call control objects, the network address objects and call control objects being related to the client capability object as child objects to parent object.

6. A method according to claim 1, including making available to the calling party different user profile data for the called party depending on the time of day.

7. A communications system comprising:
   a) a network;
   b) a multiplicity of client terminals connected to the network, and different ones of the multiplicity of client terminals having different call control capabilities; and
   c) a directory which is accessible to the multiplicity of client terminals and which is programmed with user profile data for users of the client terminals, which user profile data includes identifiers for one or more of a plurality of different call control protocols, wherein at least one of the identifiers is for a call control protocol which is designated as being non-persistent.

8. A system according to claim 7, in which the directory is located entirely on a server which is remote from the client terminals and which is accessed via the network.

9. A system according to claim 7, in which the directory comprises directory system proxies located locally at respective ones of the client terminals and a database which is located remotely from the client terminals and which is accessible via the directory system proxies.

10. A system according to claim 7, in which the directory includes both call control protocol identifiers and network addresses.

11. A system according to claim 7, further comprising:
    d) a server computer which determines whether or not a called client terminal is logged into the network and providing respective identifiers of both persistent and non-persistent call control protocols to a calling client terminal based on a determination that the called client terminal is logged into the network and providing only identifiers(s) of persistent call control protocol(s) to the calling client terminal based on a determination that the called client terminal is not logged into the network.

12. A server computer connectable to a communications network, the server computer being operable to provide a directory service to client devices connected to the network, the server computer comprising:
    a) a data store for storing, for each of a plurality of users of the network, user profile data which is accessible to other users of the network, the user profile data including identifiers for one or more of a plurality of different call control protocols, wherein at least one of the identifiers is for a call control protocol which is designated as being non-persistent; and
    b) means for determining, prior to establishing a call from a calling party to a called party, if the called party is logged into the network and for making available to the calling party all of said identifiers if the called party is determined to be logged into the network and for making available to the calling party all of the identifiers except the at least one identifier designated as non-persistent if the called party is not determined to be logged into the network.

* * * * *